R. E. HALSTEAD.
VIOLIN TAILPIECE.
APPLICATION FILED DEC. 27, 1919.
1,339,196.  Patented May 4, 1920.
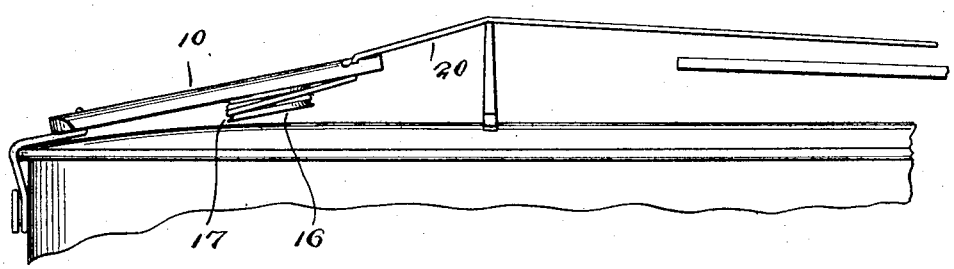
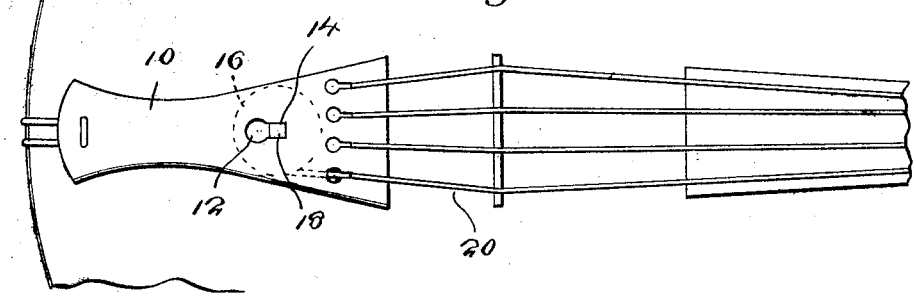
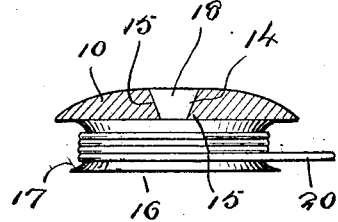
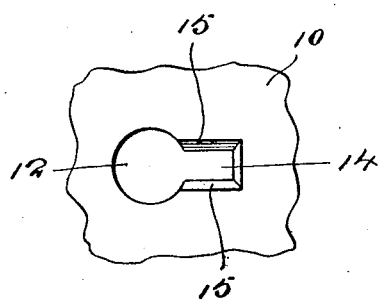
R. E. Halstead
INVENTOR.
WITNESS:
E. R. Ruppert
BY
Victor J. Evans
ATTORNEY.

UNITED STATES PATENT OFFICE.

ROBERT E. HALSTEAD, OF LOS ANGELES, CALIFORNIA.

VIOLIN-TAILPIECE.

1,339,196.  Specification of Letters Patent.  Patented May 4, 1920.

Application filed December 27, 1919. Serial No. 347,718.

*To all whom it may concern:*

Be it known that I, ROBERT E. HALSTEAD, a citizen of the United States, residing at Los Angeles, in the county of Los Angeles and State of California, have invented new and useful Improvements in Violin-Tail-pieces, of which the following is a specification.

This invention relates to a tail-piece for a violin, and the object is to provide means whereby one or more of the strings may be coiled on a reel or the like mounted on the tail-piece, this reel receiving a string of the full commercial length, in order that when a short length of the string becomes broken off, in the ordinary use of the instrument, a suitable length may be unwound from the reel, the free end of the string being secured in the usual way.

The reel is intended particularly for use in connection with the E string, and the break in the latter usually occurs about three inches from one end thereof, so that it is only necessary to sacrifice a very small length of the string, the string as a whole of the usual commercial length, remaining intact, and being unwound in order to permit the free end thereof after the break occurs, to be secured to the peg. Under the present practice a string when purchased is sufficient for only about three lengths, or three strings for the instrument, and after being cut into thirds, any string upon being broken is, of course, entirely discarded. It is estimated that by the use of the reel for the E string, the expense for this item will be reduced by approximately three-fourths.

In the drawings,

Figure 1 is a fragmentary view in side elevation, showing the tail piece with the reel mounted thereon. Fig. 2 is a top plan view. Fig. 3 is a transverse section through the tail piece, the reel being in elevation, and Fig. 4 is a detail view showing the aperture and slot for receiving the pin on which the reel is mounted.

The tail-piece of a violin is designated as a whole by the reference number 10, this tail-piece being provided with an aperture 12 having an offset slot 14 connected therewith. The walls of this slot are undercut as shown at 15.

The reel 16 is provided with an annular groove 17, and with a peg or stem 18, the stem being tapered as shown, and the portion thereof of larger cross section being at the outer or free end.

This member 18 above referred to is inserted into the aperture 12 of the tail-piece and the tapered portion conforms to the bevel of the walls 15 of the slotted portion 14, thereby retaining the reel in position when under tension of the string connected therewith. The string wound on the reel is designated 20.

It will be understood that the reel is readily rotatable in aperture 12 when the tension is released, due to the breaking of the spring.

What is claimed is—

1. The combination with a tail-piece of a violin having an aperture formed therein and a slotted portion offset from the aperture, of a reel and a stem constituting a mounting member for the reel, said stem being proportioned to enter the aperture and positively engage the walls of the offset slotted portion.

2. The combination with the tail-piece of a violin having an apertured central portion and having a slotted portion with undercut walls offset from the aperture, of a reel and a tapered stem for mounting the reel, said stem engaging the undercut walls of the slotted portion.

In testimony whereof I affix my signature.

ROBERT E. HALSTEAD.